US011290926B2

(12) United States Patent
Melander et al.

(10) Patent No.: US 11,290,926 B2
(45) Date of Patent: Mar. 29, 2022

(54) DISCOVERING HANDOVER CAPABILITIES OF A MOBILE COMMUNICATION NETWORK

(71) Applicant: Deutsche Telekom AG, Bonn (DE)

(72) Inventors: Mari Melander, Bonn (DE); Rene Ververgaert, Bonn (DE)

(73) Assignee: DEUTSCHE TELEKOM AG, Bonn (DE)

( * ) Notice: Subject to any disclaimer, the term of this patent is extended or adjusted under 35 U.S.C. 154(b) by 130 days.

(21) Appl. No.: 15/738,607

(22) PCT Filed: May 24, 2016

(86) PCT No.: PCT/EP2016/061670
§ 371 (c)(1),
(2) Date: Dec. 21, 2017

(87) PCT Pub. No.: WO2016/206897
PCT Pub. Date: Dec. 29, 2016

(65) Prior Publication Data
US 2018/0199247 A1 Jul. 12, 2018

(30) Foreign Application Priority Data
Jun. 24, 2015 (EP) ..................... 15173689

(51) Int. Cl.
*H04W 36/00* (2009.01)
*H04W 36/24* (2009.01)
*H04W 36/14* (2009.01)
*H04W 48/16* (2009.01)
*H04W 84/12* (2009.01)

(52) U.S. Cl.
CPC ... *H04W 36/0066* (2013.01); *H04W 36/0088* (2013.01); *H04W 36/14* (2013.01);
(Continued)

(58) Field of Classification Search
CPC . H04W 36/0066; H04W 36/14; H04W 48/16; H04W 36/0088; H04W 84/12
(Continued)

(56) References Cited

U.S. PATENT DOCUMENTS

2008/0219215 A1 9/2008 Olvera-Hernandez et al.
2010/0190533 A1 7/2010 Black et al.
(Continued)

FOREIGN PATENT DOCUMENTS

JP 2010518748 A 5/2010
JP 2012516109 A 7/2012
(Continued)

OTHER PUBLICATIONS

"3$^{rd}$ Generation Partnership Project; Technical Specification Group Core Network and Terminals; Access Network Discovery and Selection Function (ANDSF) Management Object (MO) (Release 12)", 3GPP Standard; 3GPP TS 24.312, 3rd Generation Partnership Project (3GPP), vol. CT WG1, No. V12.8.0, Mar. 19, 2015 (Mar. 19, 2015), pp. 1-375, XP050927791, p. 16-34.
(Continued)

*Primary Examiner* — Christopher M Crutchfield
*Assistant Examiner* — Jean F Voltaire
(74) *Attorney, Agent, or Firm* — Leydig, Voit & Mayer, Ltd.

(57) ABSTRACT

Method for discovering handover capabilities of a mobile communication network includes: receiving, by a user equipment, handover capability information from the mobile communication network, wherein the user equipment communicates with a core network using either a first or a second radio access technology; and based on the first radio access technology being used, initiating handover, by the user equipment, from the first to the second radio access technology when the handover capability information indicates
(Continued)

a capability of the mobile communication network to support a handover from the first to the second radio access technology; and/or based on the second radio access technology being used, initiating handover, by the user equipment, from the second to the first radio access technology when the handover capability information indicates a capability, of the mobile communication network to support a handover from the second radio access technology to the first radio access technology.

17 Claims, 3 Drawing Sheets

(52) U.S. Cl.
CPC ........... H04W 36/24 (2013.01); H04W 48/16 (2013.01); *H04W 84/12* (2013.01)

(58) Field of Classification Search
USPC ........................................................ 370/329
See application file for complete search history.

(56) References Cited

U.S. PATENT DOCUMENTS

| | | | |
|---|---|---|---|
| 2011/0171953 A1 | 7/2011 | Faccin et al. | |
| 2011/0256834 A1* | 10/2011 | Dayal | H04W 16/14 455/67.7 |
| 2014/0204904 A1* | 7/2014 | Xiang | H04W 36/0066 370/331 |
| 2014/0233386 A1* | 8/2014 | Jamadagni | H04W 36/22 370/235 |
| 2014/0341076 A1* | 11/2014 | Orlandi | H04W 48/16 370/254 |
| 2015/0011211 A1* | 1/2015 | Plestid | H04W 36/24 455/436 |
| 2015/0365862 A1* | 12/2015 | Teyeb | H04W 36/14 455/436 |
| 2017/0118787 A1* | 4/2017 | Kekki | H04L 69/163 |
| 2017/0332279 A1* | 11/2017 | Kobayashi | H04W 4/06 |

FOREIGN PATENT DOCUMENTS

| | | |
|---|---|---|
| JP | 2013516932 A | 5/2013 |
| KR | 20070024251 A | 3/2007 |
| WO | WO 2015062643 A1 | 5/2015 |

OTHER PUBLICATIONS

"3$^{rd}$ Generation Partnership Project; Technical Specification Group Core Network and Terminals; Access to the 3GPP Evolved Packet Core (EPC) via non-3GPP access networks; Stage 3 (Release)", 3GPP Standard; 3GPP TS 24.302, 3$^{rd}$ Generation Partnership Project (3GPP), vol. CT WG1, No. V13.1.0, Mar. 19, 2015 (Mar. 19, 2015), pp. 1-104, XP050927788, Chapter 5.

* cited by examiner

DISCOVERING HANDOVER CAPABILITIES OF A MOBILE COMMUNICATION NETWORK

CROSS-REFERENCE TO RELATED APPLICATIONS

This application is a U.S. National Phase application under 35 U.S.C. § 371 of International Application No. PCT/EP2016/061670, filed on May 24, 2016, and claims benefit to European Patent Application No. EP 15173689.9, filed on Jun. 24, 2015. The International Application was published in English on Dec. 29, 2016 as WO 2016/206897 A1 under PCT Article 21(2).

FIELD

The present invention relates to a method for discovering handover capabilities of a mobile communication network, wherein a user equipment is able to be connected to the mobile communication network using a first radio access technology, wherein the user equipment is able to be connected to the mobile communication network using a second radio access technology.

Furthermore, the present invention relates to a system for discovering handover capabilities of a mobile communication network, wherein the system comprises the mobile communication network, a wireless access point being connected to the core network via an external packet data network, and a user equipment, wherein the user equipment is able to be connected to the mobile communication network using a first radio access technology, wherein the user equipment is able to be connected to the mobile communication network using a second radio access technology.

Additionally, the present invention relates to a user equipment, to a computer program and to a computer program product for discovering handover capabilities of a mobile communication network.

The present invention generally relates to user equipments attaching to a mobile communication network via wireless local area networks (WLANs), also called WiFi access, to the mobile communication network.

BACKGROUND

A mobile terminal may obtain access to a core network of a mobile communications network via a wireless network. "Wireless Calling" or "WiFi Calling" relate to the case that a wireless local area network (WLAN) or WiFi network is used for mobile access to the mobile communications network. In this case, the mobile services of the mobile telecommunications network are provided to the mobile terminal via a WiFi network. These mobile services may include voice, data and multimedia services such as Internet multimedia Subsystem (IMS) services and/or Session Initiation Protocol (SIP) services of the mobile telecommunications network. Internet Multimedia Subsystem (IMS) based WiFi Calling over untrusted WiFi—which may be any WiFi network—is specified in GSMA PRD IR.51 and 3GPP TS 23.402.

Typically, the mobile terminal—which is herein also called a user equipment—lacks information on the existence of network support for handover. This might lead to connection failures, especially in case that the user equipment continues to initiate handover procedures despite a lack of network support for handover.

SUMMARY

In an exemplary embodiment, the present invention provides a method for discovering handover capabilities of a mobile communication network. The mobile communication network includes a core network and a radio access network. A user equipment is able to be connected to the mobile communication network using a first radio access technology, and the user equipment is able to be connected to the mobile communication network using a second radio access technology. The method includes: receiving, by the user equipment, handover capability information from the mobile communication network, wherein the user equipment communicates with the core network using either the first or the second radio access technology; and based on the first radio access technology being used for communication with the core network, initiating handover, by the user equipment, from the first radio access technology to the second radio access technology when the handover capability information, received from the mobile communication network, indicates a capability of the mobile communication network to support a handover from the first radio access technology to the second radio access technology; and/or based on the second radio access technology being used for communication with the core network, initiating handover, by the user equipment, from the second radio access technology to the first radio access technology when the handover capability information, received from the mobile communication network, indicates a capability of the mobile communication network to support a handover from the second radio access technology to the first radio access technology.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Exemplary embodiments of the present invention improve the user convenience and reliability with respect to the connectivity between the user equipment and the mobile communication network, when mobile services are used by the user equipment, especially in case of a user equipment being connected to the mobile services via the access network of the mobile communication network or in case of a WiFi Calling user equipment being connected to the mobile services via the wireless network.

In an exemplary embodiment, the present invention provides a method for discovering handover capabilities of a mobile communication network, wherein the mobile communication network comprises a core network and a radio access network, wherein a user equipment is able to be connected to the mobile communication network using a first radio access technology, wherein the user equipment is able to be connected to the mobile communication network using a second radio access technology, wherein the method comprises the following steps:

the user equipment receives handover capability information from the mobile communication network and the user equipment using either the first or the second radio access technology for communication with the core network, the user equipment, in case it is using the first radio access technology, initiates handover, from the first radio access technology to the second radio access technology, only in case that the handover capability information, received from the mobile communication network, indicates a capability of the mobile communication network to support a handover from the first radio access technology to the second radio access technology, and/or the user equipment, in case it is using the second radio access technology, initiates handover, from the second radio access technology to the first radio access technology, only in case that the handover capability information, received from the mobile communication network, indicates a capability of the mobile communication network to support a handover from the second radio access technology to the first radio access technology.

It is thereby advantageously possible according to the present invention to reduce the design work for the user equipment, especially for a WiFi (Wireless Fidelity) calling terminal. According to the present invention, the wireless network is preferably a wireless local area network (WLAN), more preferably a WiFi network. Via discovering the handover capabilities of the wireless network, the energy consumption of the user equipment is improved as it is prevented from constantly retrying to handover for WiFi Calling, when the wireless network does not support the handover.

According to the present invention, it is preferred that "handover" means the capability to maintain the Internet Protocol (IP) address when moving between the accesses (e.g. the capability to maintain the IP address during and after a change from one radio access technology to another radio access technology) and the capability to move an existing call between the accesses (e.g. the capability to transfer an existing call from one radio access technology to another radio access technology without interruption or ceaselessly).

According to the present invention, it is preferred that the discovery procedure is a dynamic procedure for the user equipment to discover whether or not the (mobile communication) network supports handover between Long Term Evolution (LTE) and WiFi, which includes the step of receiving, by the user equipment, a handover capability indication (handover capability information) from the (mobile communication) network. Thereby, the user equipment only initiates handover, if the (mobile communication) network has indicated that the (mobile communication) network supports the handover.

According to the present invention, it is preferred that "the handover capability information, received from the mobile communication network, indicates a capability of the mobile communication network to support a handover from the first/second radio access technology to the second/first radio access technology" means that the handover capability information explicitly indicates the capability of the mobile communication network to support the respective handover (for example "handover supported"). Alternatively, the handover capability information may also implicitly indicate the capability of the mobile communication network to support the respective handover in that an indication—that the mobile communication network does not support the respective handover (for example "handover unsupported")—is absent or missing.

According to the present invention, it is preferred that the handover capability information relates to the capability of the mobile communication network to support handover between Long Term Evolution (LTE) access technology of the radio access network and wireless local area network (WLAN) access technology of a wireless access point, the wireless access point being connected to the mobile communication network via an external packet data network, wherein the wireless local area network (WLAN) access technology is preferably the WiFi access technology. Preferably, the capability of the mobile communication network to support handover "between" Long Term Evolution (LTE) access technology of the radio access network and wireless local area network (WLAN) access technology of the wireless access point relates to the capability of the mobile communication network to:

only support handover from LTE access technology to WLAN technology, or only support handover from WLAN access technology to LTE access technology, or support handover, both, from LTE access technology to WLAN access technology and from WLAN access technology to LTE access technology.

According to the present invention, it is preferred that the handover capability information is either access dependent—which means, in particular, that the handover capability information indicates the capability to support handover from the currently used network to the other one—or that the handover capability information is access independent which means, in particular, that the capability information indicates all possibilities (i.e. the handover capability information includes an information whether the network has the capability to only support handover from the first to the second access technology, whether the network has the capability to only support handover from the second to the first access technology, or whether the network has the capability to support, both, the handover from the first to the second and from the second to the third access technology).

According to the present invention, it is preferred that the first radio access technology is the Long Term Evolution (LTE) access technology of the radio access network of the mobile communication network and wherein the second radio access technology is the wireless local area network (WLAN) access technology of a wireless access point.

According to the present invention, it is thereby advantageously possible that mobile services are reliably provided via an untrusted wireless local area network upon change of the radio access technology (i.e. from LTE access technology to WLAN access technology or vice versa), wherein connection failures are prevented and a transfer of mobile services can be guaranteed without interruptions or unnecessary battery drain.

According to the present invention, it is preferred that in case handover is possible in two directions—which means, for example, that the network supports handover from the first to the second radio access technology (e.g. WiFi to LTE) and from the second to the first radio access technology (e.g. LTE to WiFi)—the handover capability information includes an information that handover is possible in both directions which means, for example, that the network supports handover from WiFi to LTE and from LTE to WiFi.

According to an exemplary embodiment, it is preferred that the network supports handover from WiFi to LTE radio access technology and handover from LTE to WiFi radio access technology. In this case, the handover capability information includes an information that handover is possible from WiFi to LTE radio access technology, and that handover is possible from LTE to WiFi radio access technology. Thus, the user equipment discovers the network support for handover from WiFi to LTE radio access technology and the network support for handover from LTE to WiFi radio access technology. According to the present invention, the user equipment, in case it is using WiFi radio access technology (for example initially or after a handover from another radio access technology to WiFi radio access technology), initiates a handover from WiFi to LTE radio access technology, only if the discovered handover capability indicates that the network supports handover from WiFi to LTE radio access technology. Here, the mobile communication network supports handover from WiFi to LTE radio access technology and the handover capability information comprises an indication that the network supports the handover from WiFi to LTE radio access technology. In this case, in which the discovered handover capability indicates that the network supports handover from WiFi to LTE radio access technology, the handover from WiFi to LTE is initiated by the user equipment. Alternatively, a situation might occur, for example, in which the handover capability information indicates nothing or erroneous information and the user equipment does not discover the network support for handover from WiFi to LTE radio access technology (although the mobile communication network supports the handover from WiFi to LTE). In this scenario, the user equipment prevents the initiation of the handover from WiFi to LTE due to a lack of information existing within the user equipment that the mobile communication network supports the handover from WiFi to LTE radio access technology. Thereby, it is advantageously possible to prevent connection failures and/or battery drain due to unsuccessful handover attempts. According to the present invention, the user equipment, in case it is using LTE radio access technology (for example initially or after a handover from another radio access technology to LTE radio access technology), initiates a handover from LTE to WiFi radio access technology, only if the discovered handover capability indicates that the network supports handover from LTE to WiFi radio access technology. Here, the mobile communication network supports in addition to the support for handover from WiFi to LTE radio access technology handover from LTE to WiFi radio access technology and the handover capability information comprises an information that the mobile communication network supports handover from LTE to WiFi radio access technology. In this case, in which the discovered handover capability indicates that the network supports LTE to WiFi handover, the handover from LTE to WiFi radio access technology is initiated by the user equipment. Alternatively, a situation might occur, for example, in which the handover capability information indicates nothing or erroneous information and the user equipment does not discover the network support for handover from LTE to WiFi radio access technology (although the mobile communication network supports the handover from LTE to WiFi). In this scenario, the user equipment prevents the initiation of the handover from LTE to WiFi radio access technology, due to a lack of information existing within the user equipment that the mobile communication network supports handover from LTE to WiFi radio access technology. Thereby, it is advantageously possible to prevent connection failures and/or battery drain due to unsuccessful handover attempts.

According to the present invention, it is furthermore preferred that in case handover is supported in only one of the two directions which means, for example, that the network only supports handover either from LTE to WiFi or from WiFi to LTE the user equipment discovers the network support for one of the two directions and preferably prevents the initiation of handover into the other one of the two directions as long as the user equipment lacks an information (especially handover capability information) that the network also supports handover into the other one of the two directions.

According to further exemplary embodiment, it is preferred that the network only supports handover from WiFi to LTE radio access technology. In this case, the handover capability information includes an information that handover is possible from WiFi to LTE radio access technology, but lacks an information that handover is possible from LTE to WiFi radio access technology. Thus, the user equipment discovers the network support only for handover from WiFi to LTE radio access technology. According to the present invention, the user equipment, in case it is using WiFi radio access technology, initiates a handover from WiFi to LTE radio access technology, only if the discovered handover capability indicates that the network supports handover from WiFi to LTE radio access technology. Here, the mobile communication network supports handover from WiFi to LTE radio access technology and the handover capability information comprises an indication that the network supports the handover from WiFi to LTE radio access technology. In this case, in which the discovered handover capability indicates that the network supports handover from WiFi to LTE radio access technology, the handover from WiFi to LTE radio access technology is initiated by the user equipment. Alternatively, a situation might occur, for example, in which the handover capability information indicates nothing or erroneous information and the user equipment does not discover the network support for handover from WiFi to LTE radio access technology (although the mobile communication network supports the handover from WiFi to LTE). In this scenario, the user equipment prevents the initiation of the handover from WiFi to LTE radio access technology due to a lack of information existing within the user equipment that the mobile communication network supports the handover from WiFi to LTE radio access technology. Thereby, it is advantageously possible to prevent connection failures and/or battery drain due to unsuccessful handover attempts. According to the present invention, the user equipment, in case it is using LTE radio access technology (for example initially or after a handover from WiFi radio access technology to LTE radio access technology), initiates a handover from LTE to WiFi radio access technology, only if the discovered handover capability indicates that the network supports handover from LTE to WiFi radio access technology. Here, the mobile communication network lacks support for handover from LTE to WiFi radio access technology and the handover capability information lacks an information that the mobile communication network supports handover from LTE to WiFi radio access technology. In this case, in which the handover capability information does not indicate that the network supports LTE to WiFi handover, the user equipments prevents a handover from LTE to WiFi radio access technology. Thereby, it is advantageously possible to prevent connection failures and/or battery drain due to unsuccessful handover attempts.

According to a still further exemplary embodiment, it is preferred that the network only supports handover from LTE to WiFi radio access technology. In this case, the handover capability information includes an information that handover is possible from LTE to WiFi radio access technology, but lacks an information that handover is possible from WiFi to LTE radio access technology. Thus, the user equipment discovers the network support only for handover from LTE to WiFi radio access technology. According to the present invention, the user equipment, in case it is using LTE radio access technology, initiates a handover from LTE to WiFi radio access technology, only if the discovered handover capability indicates that the network supports handover from LTE to WiFi radio access technology. Here, the mobile communication network supports handover from LTE to WiFi radio access technology and the handover capability information comprises an indication that the network supports the handover from LTE to WiFi radio access technology. In this case, in which the discovered handover capability indicates that the network supports handover from LTE to WiFi radio access technology, the handover from LTE to WiFi radio access technology is initiated by the user equipment. Alternatively, a situation might occur, for example, in which the handover capability information indicates nothing or erroneous information and the user equipment does not discover the network support for handover from LTE to WiFi radio access technology (although the mobile communication network supports the handover from LTE to WiFi). In this scenario, the user equipment prevents the initiation of the handover from LTE to WiFi radio access technology due to a lack of information existing within the user equipment that the mobile communication network supports the handover from LTE to WiFi radio access technology. Thereby, it is advantageously possible to prevent connection failures and/or battery drain due to unsuccessful handover attempts. According to the present invention, the user equipment, in case it is using WiFi radio access technology (for example initially or after a handover from LTE radio access technology to WiFi radio access technology), initiates a handover from WiFi to LTE radio access technology, only if the discovered handover capability indicates that the network supports handover from WiFi to LTE radio access technology. Here, the mobile communication network lacks support for handover from WiFi to LTE radio access technology and the handover capability information lacks an information that the mobile communication network supports handover from WiFi to LTE radio access technology. In this case, in which the handover capability information does not indicate that the network supports WiFi to LTE handover, the user equipments prevents a handover from WiFi to LTE radio access technology. Thereby, it is advantageously possible to prevent connection failures and/or battery drain due to unsuccessful handover attempts.

According to a yet further exemplary embodiment, it is preferred that the network supports neither handover from WiFi to LTE radio access technology, nor handover from LTE to WiFi radio access technology. In this case, the handover capability information lacks an information that handover is possible from WiFi to LTE radio access technology, and lacks an information that handover is possible from LTE to WiFi radio access technology. Thus, the user equipment is prevented from discovering that the network supports handover from WiFi to LTE or LTE to WiFi radio access technology. In case the user equipment is using WiFi radio access technology, the user equipment prevents the initiation of the handover from WiFi to LTE radio access technology, due to a lack of information existing within the user equipment that the mobile communication network supports the handover from WiFi to LTE radio access technology. Thereby, it is advantageously possible to prevent connection failures and/or battery drain due to unsuccessful handover attempts. In case the user equipment is using LTE radio access technology, the user equipment prevents the initiation of the handover from LTE to WiFi radio access technology, due to a lack of information existing within the user equipment that the mobile communication network supports the handover from LTE to WiFi radio access technology. Thereby, it is advantageously possible to prevent connection failures and/or battery drain due to unsuccessful handover attempts.

According to the present invention, it is furthermore preferred that the wireless access point is connected to the mobile communication network via an external packet data network, wherein the wireless local area network (WLAN) access technology is preferably the WiFi access technology.

According to the present invention, it is thereby advantageously possible to maintain an Internet Protocol (IP) session or connection (e.g. for mobile data or telephone services provided via the wireless access point) during and after a change from wireless local area network access technology to LTE radio access technology.

According to the present invention, it is furthermore preferred that the handover capability information is included in a management object (MO), preferably an Internet multimedia Subsystem (IMS) management object, wherein parameters of the management object are configured over the air using device management, preferably using the Open Mobile Alliance Device Management (OMA DM) protocol.

According to the present invention, it is thereby advantageously possible that the user equipment is enabled to discover the network support for handover by Over the Air (OTA) configuration. Preferably, a new parameter set for WiFi to LTE and LTE to WiFi handover capabilities is defined either in a new or an existing Management Object (MO), for example in an Internet Multimedia System Management Object (IMS MO) defined in 3GPP TS 24.167. The values of the parameter set are then configured over the air using device management, for example OMA DM. In particular, the discovery of the network support for handover by Over the Air (OTA) configuration is a dynamic discovery procedure according to the present invention. Here, the capability information is preferably access independent.

According to the present invention, it is furthermore preferred that the user equipment receives handover capability information from the mobile communication network upon initiation of a dynamic discovery procedure.

According to the present invention, it is thereby advantageously possible that the capability of the mobile communication network to support handover between the first and second radio access technology is discovered during attachment of the user equipment to the network which provides access of the user equipment to the core network of the mobile communication network (for example, either the wireless access point using the wireless local area network (WLAN) access technology or the eNodeB using the Long Term Evolution (LTE) access technology).

According to the present invention, it is furthermore preferred that the dynamic discovery procedure is initiated during attachment, of the user equipment to the wireless access point, for the communication of the user equipment with the core network of the mobile communication network, wherein the wireless local area network (WLAN) access technology of the wireless access point is used during the attachment, wherein preferably an Internet Key Exchange protocol is used to transmit the handover capability information from an Evolved Packet Data Gateway (ePDG) of the core network to the user equipment.

According to the present invention, it is thereby advantageously possible that a dynamic discovery procedure is realized upon attachment of the user equipment to the wireless access point using the wireless local area network (WLAN) access technology in that, for example, an attach procedure is enhanced to carry the handover capability indication (handover capability information).

According to the present invention, it is furthermore preferred that the discovery procedure is initiated during attachment, of the user equipment to the radio access network, for the communication of the user equipment with the core network of the mobile communication network, wherein the Long Term Evolution (LTE) access technology of the radio access network is used during the attachment, wherein preferably an ATTACH ACCEPT message is used to transmit the handover capability information from the mobile communication network to the user equipment.

According to the present invention, it is thereby advantageously possible that a dynamic discovery procedure is realized upon attachment of the user equipment to the radio access network of the mobile communication network using the Long Term Evolution (LTE) radio access technology in that an LTE attach procedure is enhanced to carry the handover capability indication (handover capability information).

According to the present invention, it is furthermore preferred that the discovery procedure is initiated by the user equipment after an attachment of the user equipment to the mobile communication network, wherein the discovery procedure includes transmitting, from the user equipment to the mobile communication network, a request for handover capability information,
the handover capability information being related to the capability of the mobile communication network to support a handover from the first radio access technology to the second radio access technology
and/or
the handover capability information being related to the capability of the mobile communication network to support a handover from the second radio access technology to the first radio access technology.

According to the present invention, it is thereby advantageously possible that the user equipment is enabled to discover the capabilities of the mobile communication network to support handover between the first and second radio access technology after attachment or during use of mobile communication services provided by the core network of the mobile communication network.

Furthermore, the present invention relates to a system for discovering handover capabilities of a mobile communication network, wherein the mobile communication network comprises a core network and a radio access network, wherein the system comprises the mobile communication network, a wireless access point being connected to the core network via an external packet data network and a user equipment, wherein the user equipment is able to be connected to the mobile communication network using a first radio access technology,
wherein the user equipment is able to be connected to the mobile communication network using a second radio access technology, wherein the mobile communication network is configured to transmit, to the user equipment, handover capability information,
wherein in case of the user equipment using the first radio access technology for communication with the core network of the mobile communication network, the user equipment initiates handover—from the first radio access technology to the second radio access technology, only in case that the handover capability information, received from the mobile communication network, indicates a capability of the mobile communication network to support a handover from the first radio access technology to the second radio access technology,
and/or
wherein in case of the user equipment using the second radio access technology for communication with the core network of the mobile communication network, the user equipment initiates handover from the second radio access technology to the first radio access technology, only in case that the handover capability information, received from the mobile communication network, indicates a capability of the mobile communication network to support a handover from the second radio access technology to the first radio access technology.

Thereby, it is advantageously possible to provide a system—including a mobile communication network and a user equipment—allowing the discovery of handover capabilities of a mobile communication network by adapting the mobile communication network to transmit the handover capability information to the user equipment. The user equipment is preferably adapted to—especially during a predefined time interval—prevent the initiation of the handover procedure and/or interrupt an initiated handover procedure and/or prevent the initiation of subsequent handover procedures in case that the handover capability information lacks an information or indication that the mobile communication network supports the handover between the respective radio access technologies. Thus, battery drain due to unsuccessful handover attempts is advantageously reduced in case that the mobile communication network—permanently or temporarily—lacks support of handover between the first and second radio access technology.

According to the present invention, it is preferred that the first radio access technology is the Long Term Evolution (LTE) access technology of the radio access network of the mobile communication network and wherein the second radio access technology is the wireless local area network (WLAN) access technology of a wireless access point. According to the present invention it is furthermore preferred that the wireless access point is connected to the mobile communication network via an external packet data network, wherein the wireless local area network (WLAN) access technology is preferably the WiFi access technology.

According to the present invention, it is thereby advantageously possible that the mobile communication network of the system is adapted to reliably provide mobile services via an untrusted wireless local area network upon change of the radio access technology (i.e. from LTE access technology to WLAN access technology or vice versa), wherein connection failures are prevented and a transfer of mobile services can be guaranteed without interruptions or unnecessary battery drain. Thus, it is possible to maintain an Internet Protocol (IP) session or connection (e.g. for mobile data or telephone services provided via the wireless access point) during and after a change from wireless local area network access technology to LTE radio access technology or vice versa.

Furthermore, the present invention relates to a user equipment for discovering handover capabilities of a mobile communication network, wherein the mobile communication network comprises a core network and a radio access network, wherein the user equipment is able to be connected to the mobile communication network using a first radio access technology, wherein the user equipment is able to be connected to the mobile communication network using a second radio access technology, wherein the user equipment is configured to receive handover capability information from the mobile communication network, wherein in case of the user equipment using the first radio access technology for communication with the core network of the mobile communication network, the user equipment initiates handover from the first radio access technology to the second radio access technology, only in case that the handover capability information, received from the mobile communication network, indicates a capability of the mobile communication network to support a handover from the first radio access technology to the second radio access technology, and/or wherein in case of the user equipment using the second radio access technology for communication with the core network of the mobile communication network, the user equipment initiates handover from the second radio access technology to the first radio access technology, only in case that the handover capability information, received from the mobile communication network, indicates a capability of the mobile communication network to support a handover from the second radio access technology to the first radio access technology.

Thereby, it is advantageously possible to provide a user equipment adapted to discover handover capabilities of a mobile communication network, wherein the user equipment either prevents battery drain—in case that the mobile communication network lacks support for handover from the currently used radio access technology to another radio access technology—by preventing the initiation of the handover procedure or the user equipment performs a successful handover due to the discovery of the existence of the handover capabilities of the mobile communication network—in case that the mobile communication network supports handover from the currently used radio access technology to another radio access technology. Thus, the user convenience is improved due to less power consumption and due to the lack (or at least reduced number) of connection failures.

Additionally, the present invention relates to a computer program for discovering handover capabilities of a mobile communication network, the computer program comprising a computer readable program code for performing a method according to embodiments of the present invention.

Still additionally, the present invention relates to a computer program product for discovering handover capabilities of a mobile communication network, the computer program product comprising a storage medium, wherein a computer program according to the present invention is stored on the storage medium.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Figure 1:
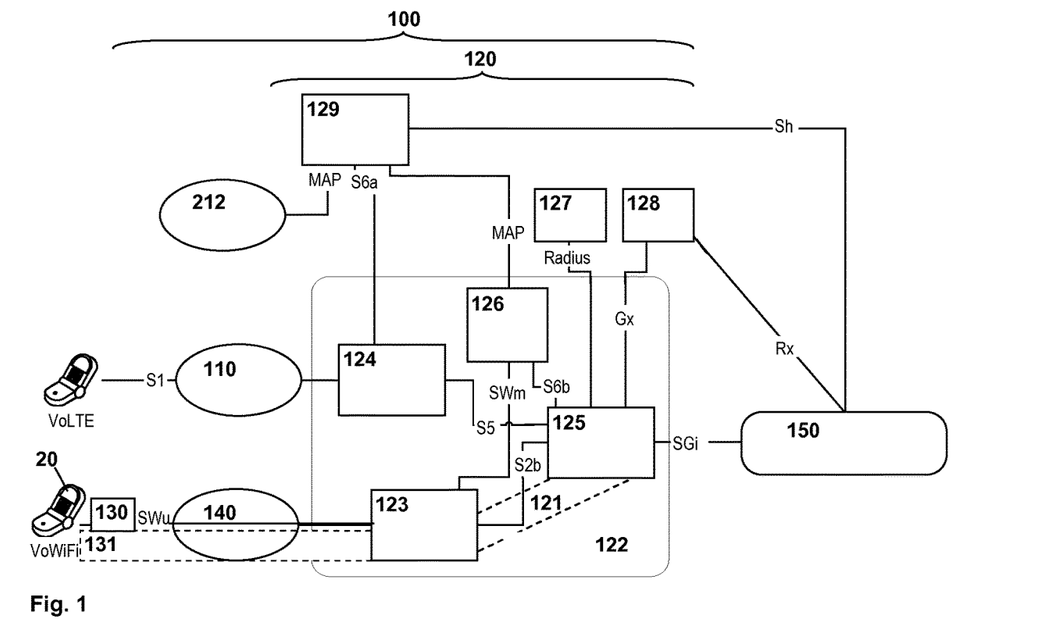
FIG. 1 illustrates a system including a mobile communication network and a user equipment according to an embodiment of the present invention.

In FIG. 1, a system according to an embodiment of the present invention is illustrated schematically, wherein the system includes a mobile communication network 100 and a user equipment 20. The mobile communication network 100 comprises an access network 110 (or a 3GPP radio access network) and a core network 120. Alternatively to the access network 110 (or 3GPP radio access network) for providing access to the mobile communication network 100, the mobile communication network 100 comprises (or is assigned or is related to) at least one wireless access point 130. For the sake of simplicity, only one wireless access point 130 is represented in FIG. 1. Typically, the wireless access point 130 is connected to an external packet data network 140, for example the Internet.

The core network 120 comprises a packet data core network 122 as well as a home location register/home subscriber server (HLR/HSS) 129, an authentication, authorization, and accounting node (AAA) 127 and a policy and charging rules function (PCRF) 128. The packet data core network 122 comprises network nodes related to the 3GPP access network, especially one mobility management entity (MME) 124 or a plurality of mobility management entities (MME) 124 (typically for different geographical areas or parts of the mobile communication network 100). In the exemplary representation of FIG. 1, only one mobility management entity (MME) 124 is shown. Furthermore, the packet data core network 122 also comprises a PDN-gateway entity or a packet data network gateway 125 (PGW—Packet Data Network (PDN) Gateway). A user equipment 20 having access to the mobile communication network 100 via the access network 110 (or 3GPP access network) and via the mobility management entity 124 is typically connected via the packet data network gateway 125 to an IP Multimedia Subsystem (IMS) 150.

The packet data core network 122 furthermore comprises an evolved packet data gateway 123, and an authentication, authorization, and accounting node regarding WiFi access (WiFi-AAA) 126. Alternatively to using the 3GPP access network, it is possible for a user equipment 20 to be connected to the mobile communication network 100 via the wireless access point 130 (and via the external packet data network 140). In this latter case, a data transmission tunnel 131—typically via an IPsec tunnel—is established between the user equipment 20 on the one hand and the evolved packet data gateway 123 on the other hand (see, for example, reference numeral 200 in FIG. 2). Furthermore, an IP transportation tunnel 121 is established between the evolved packet data gateway 123 and the packet data network gateway 125. The interfaces as indicated in FIG. 1 are typically provided between the different elements of the mobile communication network 100, and especially the different elements of the data core network 122. For example, an SWu interface is provided between the wireless access point 130 and the evolved packet data gateway 123 (via the external packet data network 140); an S2b interface is provided between the evolved packet data gateway 123 and the packet data network gateway 125; a SWm interface is provided between the evolved packet data gateway 123 and the WiFi-AAA 126; a S6b interface is provided between the packet data network gateway 125 and the WiFi-AAA 126, and a SGi interface is provided between the packet data network gateway 125 and the IP Multimedia Subsystem (IMS) 150. In addition, a MAP interface between the HLR/HSS 129 and a 3GPP 2G/3G network entity 212 is shown.

Figure 2:
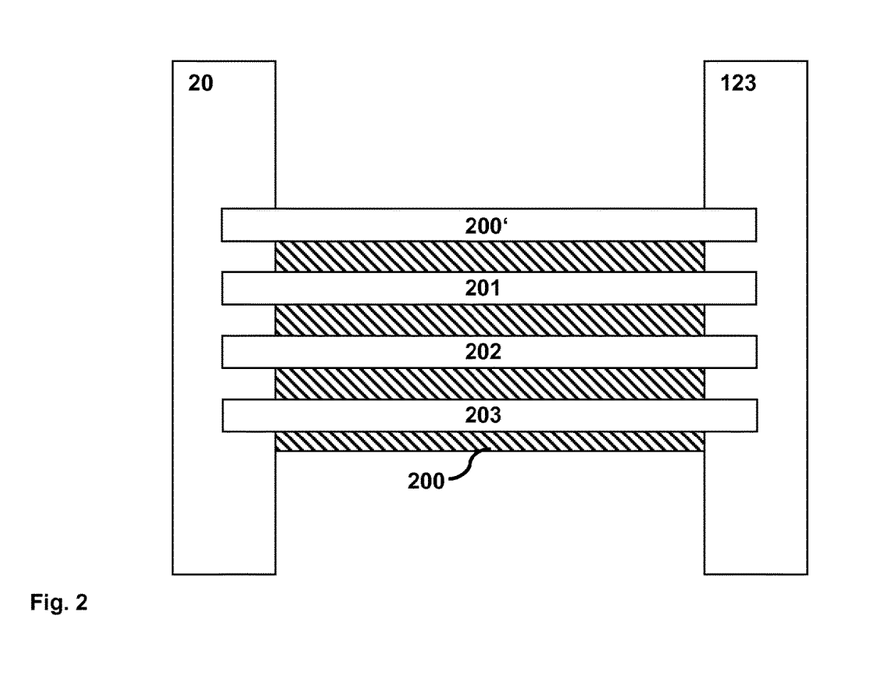
FIG. 2 illustrates a WiFi Calling protocol being used for Internet Protocol (IP) communication between the user equipment and the core network of the mobile communication network via a wireless access point according to an embodiment of the present invention.

In FIG. 2, a WiFi Calling protocol is illustrated schematically, wherein a user equipment 20 and an enhanced Packet Data Gateway (ePDG) 123 is shown. An IPsec tunnel 200 between the user equipment 20 and the enhanced Packet Data Gateway (ePDG) 123 is used to provide services of the mobile communication network 100 to the user equipment 20 via the IPsec tunnel 200. Furthermore, an Internet Key Exchange (IKE or IKEv2) protocol is illustrated by reference numeral 200', wherein the Internet Key Exchange Protocol is used to establish a security association (SA) with respect to the IPsec tunnel.

The IPsec tunnel 200 between the user equipment 20 and the enhanced Packet Data Gateway (ePDG) 123 is used for Voice-over-Long Term Evolution (VoLTE) signaling 201, wherein—for example—the Session Initiation Protocol (SIP) and/or the Session Description Protocol (SDP) is/are used. The IPsec tunnel 200 between the user equipment 20 and the enhanced Packet Data Gateway (ePDG) 123 is additionally and/or alternatively used for media services 202, wherein, for example, the Real-time Transport Protocol (RTP) and/or the Real-time Transport Protocol Control Protocol (RTPCP) is/are used. The IPsec tunnel 200 between the user equipment 20 and the enhanced Packet Data Gateway (ePDG) 123 is additionally and/or alternatively used for Internet services 203, wherein—for example—the Hypertext Transfer Protocol (HTTP) is used.

WiFi Calling includes the use of an existing WiFi connection by the user equipment 20 to create an IPsec tunnel 200 with a network node enhanced Packet Data Gateway (ePDG) 123. The IPsec tunnel is used to connect to the mobile packet core network 122 (see FIG. 1). Subsequently, the IPsec tunnel is used to register to the Internet Multimedia Subsystem (IMS) for telephony services. The enhanced Packet Data Gateway (ePDG) based WiFi Calling includes support of handover between Long Term Evolution (LTE) and WiFi accesses. During a handover procedure, the user equipment 20 moves seamlessly between WiFi access network 140 and an LTE access network either in idle state or during a Voice-over-LTE (VoLTE)/WiFi call. Thereby, the Internet Protocol (IP) address of the user equipment 20 is unchanged and the bearers for signaling and media are carried over to the new access, wherein "new access" particularly refers either to the use of the second radio access technology after successful handover from the first radio access technology or to the use of the first radio access technology after successful handover from the second radio access technology. The respective handover procedures are initiated by the user equipment 20 and require specific support from both, the user equipment and the network, in particular the mobile communication network 100. Due to different kind of challenges related to the network's internal structure, it is possible that the network lacks handover support, but the user equipment 20 supports handover.

According to the present invention it is advantageously possible that—due to the dynamic discovery of network handover capability by the user equipment 20—the handover procedures are either successful or not initiated by the user equipment 20 at all—and typically do not fail. According to the present invention, a dynamic procedure is defined for the user equipment 20 to discover whether or not the network supports handover between Long Term Evolution (LTE) and WiFi radio access technologies. This means, in particular, that the user equipment 20 receives a handover capability indication from the mobile communication network 100 and the user equipment 20 only initiates handover, if the mobile communication network 100 has indicated that the mobile communication network 100 supports handover between Long Term Evolution (LTE) and WiFi radio access technologies.

Figure 3:
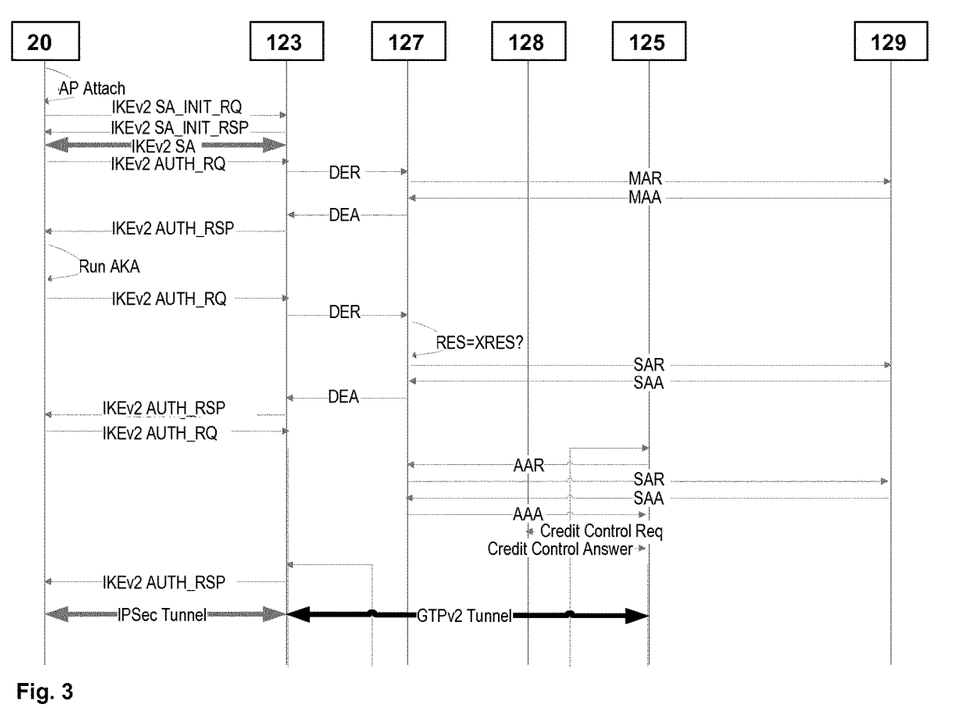
FIG. 3 shows an attachment procedure of the user equipment to the mobile communication network via the wireless access point according to an embodiment of the present invention.
Figure 4:
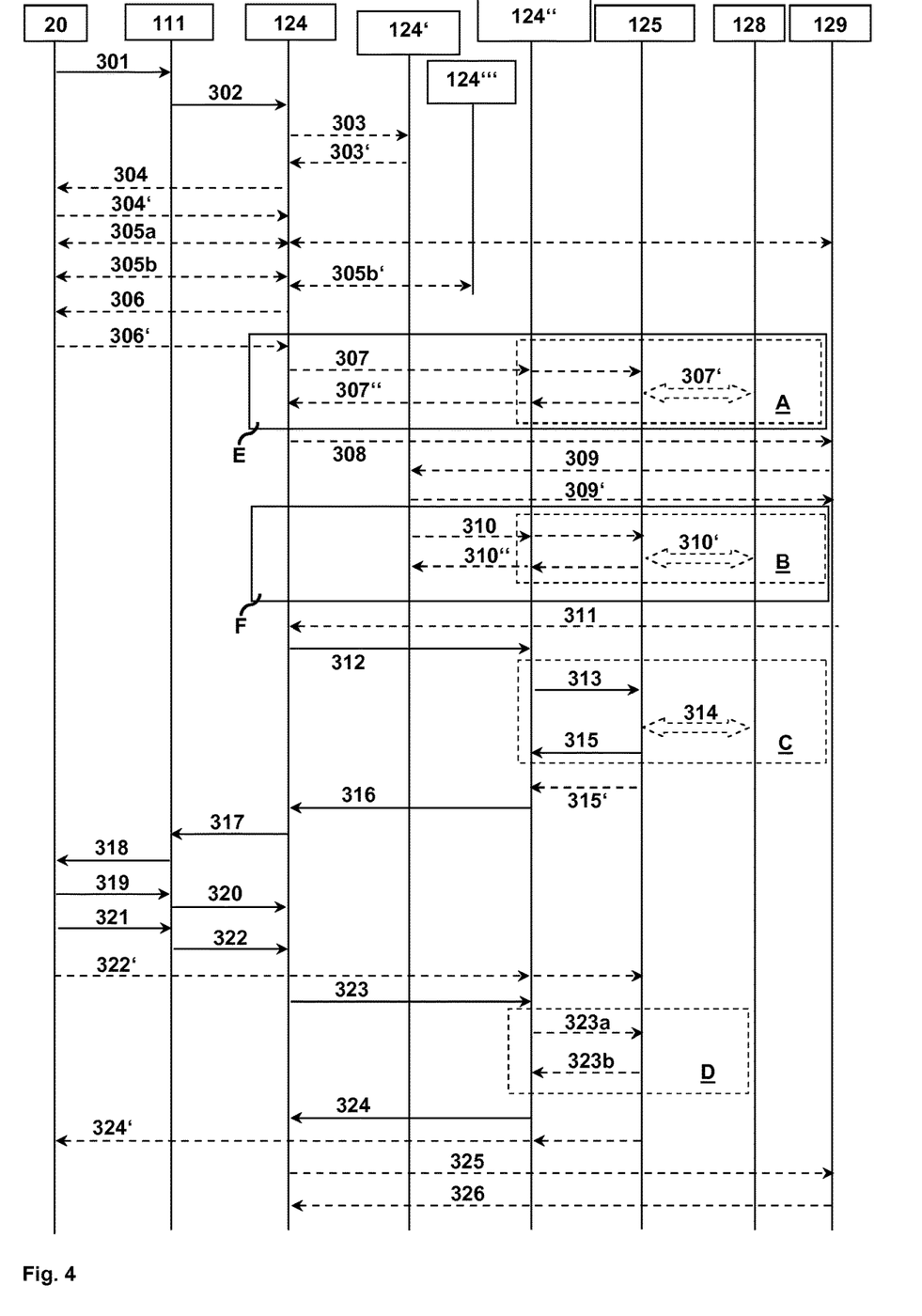
FIG. 4 shows an attachment procedure of the user equipment to the mobile communication network via the access network of the mobile communication network according to an embodiment of the present invention.

In FIGS. 3 and 4 an attachment procedure of the user equipment 20 to the mobile communication network 100 are shown, wherein the user equipment 20 attaches either via the wireless access point 130 (FIG. 3) or via the access network 110 of the mobile communication network 100 (FIG. 4). According to a preferred embodiment of the present invention, the method includes a dynamic discovery, wherein the user equipment 20 receives handover capability information from the mobile communication network 100 upon initiation of the dynamic discovery procedure, wherein the dynamic discovery procedure is especially initiated during attachment of the user equipment 20 either to the access network 110 of the mobile communication network 100 or to the wireless access point 130. According to the present invention, it is preferred that the user equipment 20 discovers the handover capability of the mobile communication network 100 during attach procedures. This means, in particular, that the standard handover procedures are enhanced to carry the handover capability indication.

In FIG. 3, an attach procedure is shown, wherein the user equipment 20 attaches to the mobile packet core 122 via the enhanced Packet Data Gateway (ePDG) 123 over untrusted WiFi. In the attach procedure, the user equipment 20 attaches to the mobile communication network 100 (especially to the mobile packet core network 122 of the mobile communication network 100) using a wireless access point 130 and an evolved packet data gateway 123. FIG. 3 corresponds to a communication diagram between the user equipment 20, the evolved packet data gateway 123, the authentication, authorization, and accounting node (AAA) 127, the policy and charging rules function (PCRF) 128, the packet data network gateway 125, and the home location register/home subscriber server (HLR/HSS) 129.

In a first processing step, the user equipment 20 attaches to the wireless access point 130, indicated in FIG. 3 via "AP attach". In a second processing step, the user equipment 20 transmits an IKEv2 SA_INIT_RQ message to the evolved packet data gateway 123, requesting the initiation of an IPsec tunnel. In a third processing step, the evolved packet data gateway 123 transmits an IKEv2 SA_INIT RSP message to the user equipment 20, which results in the establishment of a security association (SA) between the user equipment 20 and the evolved packet data gateway 123, indicated by the double arrow "IKEv2 SA". In a fourth processing step, the user equipment 20 transmits an IKEv2

Auth_RQ (authentication request) to the evolved packet data gateway 123. In a fifth processing step, the evolved packet data gateway 123 transmits a DER (Diameter EAP (Extensible Authentication Protocol) Request) to the authentication, authorization, and accounting node (AAA) 127. In a sixth processing step, the authentication, authorization, and accounting node (AAA) 127 transmits a MAR (Multimedia Authentication Request) to the home location register/home subscriber server (HLR/HSS) 129. In a seventh processing step, the home location register/home subscriber server (HLR/HSS) 129 transmits a MAA (Multimedia Authentication Answer) to the authentication, authorization, and accounting node (AAA) 127. In an eighth processing step, the authentication, authorization, and accounting node (AAA) 127 sends a DEA (Diameter EAP Answer) to the evolved packet data gateway 123. In a ninth processing step, the evolved packet data gateway 123 transmits an IKEv2 AUTH_RSP (authentication response) to the user equipment 20. In a tenth processing step, the user equipment 20 runs an Authentication and Key Agreement protocol (AKA). In an eleventh processing step, the user equipment 20 transmits an IKEv2 AUTH_RQ (authentication request) to the evolved packet data gateway 123. In a twelfth processing step, the evolved packet data gateway 123 transmits a DER to the authentication, authorization, and accounting node (AAA) 127. In a thirteenth processing step, the authentication, authorization, and accounting node (AAA) 127 runs a verification step, indicated by "RES=XRES?" in FIG. 3. In a fourteenth processing step, the authentication, authorization, and accounting node (AAA) 127 transmits a SAR message (Server Assignment Request) to the home location register/home subscriber server (HLR/HSS) 129. In a fifteenth processing step, the home location register/home subscriber server (HLR/HSS) 129 transmits a SAA message (Server Assignment Answer) to the authentication, authorization, and accounting node (AAA) 127. In a sixteenth processing step, the authentication, authorization, and accounting node (AAA) 127 transmits a DEA to the evolved packet data gateway 123. In a seventeenth processing step, the evolved packet data gateway 123 transmits an IKEv2 AUTH_RSP (authentication response) to the user equipment 20. A further IKEv2 AUTH_RQ (authentication request) from the user equipment 20 to the evolved packet data gateway 123 triggers further processing steps indicated in FIG. 3 that result in a further IKEv2 AUTH_RSP message from the evolved packet data gateway 123 to the user equipment 20 until both the data transmission tunnel 131 (IPsec Tunnel) between the user equipment 20 and the evolved packet data gateway 123, and the IP transportation tunnel 121 between the evolved packet data gateway 123 and the packet data network gateway 125—are established (see FIG. 1).

According to one embodiment of the present invention, the user equipment 20 uses an existing WiFi connection (to a wireless access point 130) to create an IPsec tunnel to the evolved packet data gateway 123 (i.e. a network element in the mobile operator domain). Via the evolved packet data gateway 123 (or ePDG), the user equipment 20 can connect to the Mobile Enhanced Packet Core (EPC) 122 and register to IMS 150 for multimedia telephony services. In this case, during an attachment to the mobile packet core 122 via Packet Data Gateway (ePDG) 123 over untrusted WiFi, the user equipment 20 discovers the network capability for handover from WiFi radio access technology to Long Term Evolution (LTE) radio access technology. According to the present invention, the attach procedure defined in 3GPP TS 23.402 and TS 24.302 is preferably enhanced to carry the handover capability information to the user equipment 20.

According to an embodiment of the present invention, the Internet Key Exchange (IKE or IKEv2) protocol is used to transmit the handover capability indication to the user equipment 20. The Notify payload in the IKE SA_INIT response sent from the enhanced Packet Data Gateway to the user equipment 20 is preferably used for indicating the handover capability in Notify payload. According to one example of the present invention, a Handover Notify payload includes the following information:
"Type Payload: Notify (41)
   Next payload: Notify (41)
   0 . . . =Critical Bit: Not Critical
   Payload length: 28
   Protocol ID: IKE (1)
   SPI Size: 0
   Notify Message Type: Handover_Indication (xxxxx)
   Notification DATA: True"

According to one embodiment of the present invention, the handover capability information is sent, in an IKE INFORMATIONAL message, from the mobile communication network 100 to the user equipment 20.

In FIG. 4, an attachment procedure is shown, wherein the user equipment 20 attaches to the mobile packet core 122 via a Long Term Evolution (LTE) attach procedure. During the Long Term Evolution (LTE) attach procedure, the user equipment 20 attaches to the mobile communication network 100 using the access network 110 of the mobile communication network 100. FIG. 4 corresponds to a communication diagram between the user equipment 20, an eNodeB 111 of the access network 110, a (new) mobility management entity (MME) 124, a further (or old) mobility management entity (MME) or SGSN 124', an EIR 124''', a Serving Gateway (Serving GW) 124'', a PDN-gateway entity or a packet data network gateway 125 (PGW—Packet Data Network (PDN) Gateway), a policy and charging rules function (PCRF) 128 and a home location register/home subscriber server (HLR/HSS) 129. The Long Term Evolution (LTE) attach procedure includes the following processing steps 301 to 326.

In a first processing step 301, the user equipment 20 transmits an Attach Request message to the eNodeB 111 of the access network 110. In a second processing step 302, the eNodeB 111 transmits the Attach Request message to the mobility management entity (MME) 124. In a third processing step 303, the mobility management entity (MME) 124 transmits an Identification Request message to the further mobility management entity or SGSN 124', which responses by transmitting an Identification Response message to the mobility management entity 124 in a further third processing step 303'. In a fourth processing step 304, the mobility management entity (MME) 124 transmits an Identity Request message to the user equipment 20, which responses by transmitting an identity Response message in a further fourth processing step 304'. The Long Term Evolution (LTE) attach procedure continues with an Authentication/Security procedure between the user equipment 20 and the mobility management entity (MME) 124 and between the mobility management entity (MME) 124 and the home location register/home subscriber server (HLR/HSS) 129 in a fifth processing step 305a and a subsequent Identity Request/Response procedure between the user equipment 20 and the mobility management entity (MME) 124 in a further fifth processing step 305b, followed by an ME Identity Check procedure between the mobility management entity 124 and the EIR 124''' in another further fifth processing step 305b'. In a sixth processing step 306, the mobility management entity (MME) 124 transmits a Ciphered Options Request message to the user equipment 20, which response with a Ciphered Options Response message in a further sixth processing step 306'. Within block E, a seventh processing step 307 is shown, wherein a Delete Session Request message is transmitted from mobility management entity (MME) 124 to the Serving GW 124". Within block E a further block A is shown, which includes a message transmitted from the Serving GW 124" to the packet data network gateway 125, a PCEF initiated IP-CAN Session Termination between the PDN GW 125 and the PCRF 128, in further seventh processing step 307', and a subsequent message transmitted from PDN GW 125 to the Serving GW 124". In another seventh processing step 307", a Delete Session Response is transmitted from the Serving GW 124" to the mobility management entity (MME) 124. In an eighth processing step 308, a Update Location Request message is transmitted from the mobility management entity (MME) 124 to the home location register/home subscriber server (HLR/HSS) 129. In a ninth processing step 309, the home location register/home subscriber server (HLR/HSS) 129 transmits a Cancel Location message to the further mobility management entity or SGSN 124', which responses with a Cancel Location Acknowledge message in a ninth processing step 309'. Within block F, a tenth processing step 310 is shown, wherein a Delete Session Request is transmitted from the further mobility management entity or SGSN 124' to the Serving GW 124". Block F further includes Block B, wherein a message is transmitted from the Serving GW 124" to the PDN GW 125, wherein block B further includes a PCEF Initiated IP CAN Session Termination between the PDN GW 125 and the PCRF 128, in a further tenth processing step 310'. Subsequently, a message is transmitted from the PDN GW 125 to the Serving GW 124". In another tenth processing step 310", a Delete Session Response message is transmitted from the Serving GW 124" to the further mobility management entity or SGSN 124'. In an eleventh processing step 311, an Update Location Acknowledge message is transmitted from the home location register/home subscriber server (HLR/HSS) 129 to the mobility management entity (MME) 124. In a twelfth processing step 312, a Create Session Request is transmitted from the mobility management entity (MME) 124 to the Serving GW 124", thereby starting with block C, which includes a thirteenth processing step 313, wherein a Create Session Request message is transmitted from the Serving GW 124" to the PDN GW 125, followed by a PCEF Initiated IP-CAN Session Establishment/Modification between PDN GW 125 and the PCRF 128, in a fourteenth processing step 314, and a fifteenth processing step 315, wherein a Create Session Response message is transmitted from the PDN GW 125 to the Serving GW 124". In a further fifteenth processing step 315', a First Downlink Data message (in case of no handover) is transmitted from the PDN GW 125 to the Serving GW 124". In a sixteenth processing step 316, a Create Session Response message is transmitted from the Serving GW 124" to the mobility management entity (MME) 124 and an Initial Context Setup Request message is transmitted, in a seventeenth processing step 317, from the mobility management entity (MME) 124 to the eNodeB 111, including the Attach Accept. In an eighteenth processing step 318, the eNodeB 111 transmits a RRC Connection Reconfiguration message from the eNodeB 111 to the user equipment 20, which replies with a RRC Connection Reconfiguration Complete message in a nineteenth processing step 319. In a twentieth processing step 320, an Initial Context Setup Response message is transmitted from the eNodeB 111 to the mobility management entity (MME) 124. In a twenty-first processing step 321, the user equipment 20 transmits a Direct Transfer message to the eNodeB 111. The eNodeB 111 subsequently transmits an Attach complete to the mobility management entity (MME) 124 in a twenty-second processing step 322. In a further twenty-second processing step 322', a First Uplink Data message is transmitted from the user equipment 20 to the Serving GW 124" and to the PDN GW 125. In a twenty-third processing step 323, a Modify Bearer Request message is transmitted from the mobility management entity (MME) 124 to the Serving GW 124", followed by block D, which includes a further twenty-third processing step 323a, wherein a Modify Bearer Request message is transmitted from the Serving GW 124" to the PDN GW 125, and another twenty-third processing step 323b, wherein a Modify bearer Response message is transmitted from the PDN GW 125 to the Serving GW 124". Subsequently, a Modify Bearer Response message is transmitted from the Serving GW 124" to the mobility management entity (MME) 124 in a twenty-fourth processing step 324. In a further twenty-fourth processing step 324', a First Downlink Data message is transmitted from the PDN GW 125 via the Serving GW 124" to the user equipment 20. In a twenty-fifth processing step 325, a Notify Request message is transmitted from the mobility management entity (MME) 124 to the home location register/home subscriber server (HLR/HSS) 129, which responses with a Notify Response message in a twenty-sixth processing step 326.

According to one embodiment of the present invention, during the attachment to the Long Term Evolution (LTE) access network of the mobile communication network 100, the user equipment 20 discovers the capability of the mobile communication network 100 for handover from Long Term Evolution (LTE) radio access technology to WiFi radio access technology. According to the present invention, the Long Term Evolution (LTE) attach procedure defined in 3GPP TS 23.401 and TS 24.301, which is illustrated in FIG. 4, is enhanced to transmit the handover capability to the user equipment 20. According to one embodiment of the present invention, the ATTACH ACCEPT message is used to transmit the handover capability information to the user equipment 20.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for discovering handover capabilities of a mobile communication network, wherein the mobile communication network comprises a core network and a radio access network, wherein a user equipment is able to be connected to the mobile communication network using a wireless local area network (WLAN) access technology of a wireless access point, and wherein the user equipment is able to be connected to the mobile communication network using a Long Term Evolution (LTE) access technology of the radio access network of the mobile communication network, wherein the method comprises:

receiving, by the user equipment, handover capability information from the mobile communication network via the WLAN access technology, wherein the handover capability information indicates whether the mobile communication network supports handover from the WLAN access technology to the LTE access technology and is included in a management object (MO), and wherein parameters of the management object are configured over the air using device management; and initiating handover, by the user equipment, from the WLAN access technology to the LTE access technology only in case that the handover capability information, received from the mobile communication network, indicates that the mobile communication network supports handover from the WLAN access technology to the LTE access technology;

wherein the user equipment is configured not to attempt handover from the WLAN access technology to the LTE access technology in case that the user equipment does not receive handover capability information indicating that the mobile communication network supports handover from the WLAN access technology to the LTE access technology;

wherein the user equipment is further configured to—in case that the handover capability information indicates nothing or erroneous information and the user equipment does not discover that the mobile communication network supports handover from the WLAN access technology to the LTE access technology—prevent initiation of handover from the WLAN access technology to the LTE access technology due to a lack of information existing within the user equipment regarding whether the mobile communication network supports handover from the WLAN access technology to the LTE access technology.

2. The method according to claim 1, wherein the wireless access point is connected to the mobile communication network via an external packet data network.

3. The method according to claim 1, wherein the user equipment receives handover capability information from the mobile communication network upon initiation of a dynamic discovery procedure.

4. The method according to claim 3, wherein the dynamic discovery procedure is initiated during attachment, of the user equipment to a wireless access point, for the communication of the user equipment with the core network of the mobile communication network, wherein the WLAN access technology of the wireless access point is used during the attachment.

5. The method according to claim 3, wherein the dynamic discovery procedure is initiated during attachment, of the user equipment to the radio access network, for the communication of the user equipment with the core network of the mobile communication network, wherein the LTE access technology of the radio access network is used during the attachment.

6. The method according to claim 3, wherein the dynamic discovery procedure is initiated by the user equipment after an attachment of the user equipment to the mobile communication network, wherein the discovery procedure includes transmitting, from the user equipment to the mobile communication network, a request for handover capability information;

wherein the handover capability information is related to the capability of the mobile communication network to support a handover from the WLAN access technology to the LTE access technology, and/or the handover capability information is related to the capability of the mobile communication network to support a handover from the LTE access technology to the WLAN access technology.

7. A system for discovering handover capabilities of a mobile communication network, the system comprising:

the mobile communication network comprising a core network and a radio access network;

a wireless access point configured to connect to the core network via an external packet data network; and a user equipment configured to connect to the mobile communication network using a wireless local area network (WLAN) access technology of the wireless access point or a Long Term Evolution (LTE) access technology of the radio access network of the mobile communication network;

wherein the mobile communication network is configured to transmit, to the user equipment, handover capability information via the WLAN access technology, wherein the handover capability information indicates whether the mobile communication network supports handover from the WLAN access technology to the LTE access technology and is included in a management object (MO), and wherein parameters of the management object are configured over the air using device management;

wherein the user equipment is further configured to initiate a handover from the WLAN access technology to the LTE access technology when the user equipment is using the WLAN access technology for communication with the core network of the mobile communication network only in case that the handover capability information, received from the mobile communication network, indicates that the mobile communication network supports handover from the WLAN access technology to the LTE access technology; and wherein the user equipment is further configured not to attempt handover from the WLAN access technology to the LTE access technology in case that the user equipment does not receive handover capability information indicating that the mobile communication network supports handover from the WLAN access technology to the LTE access technology;

wherein the user equipment is further configured to—in case that the handover capability information indicates nothing or erroneous information and the user equipment does not discover that the mobile communication network supports handover from the WLAN access technology to the LTE access technology—prevent initiation of handover from the WLAN access technology to the LTE access technology due to a lack of information existing within the user equipment regarding whether the mobile communication network supports handover from the WLAN access technology to the LTE access technology.

8. The system according to claim 7, wherein the WLAN access technology is WiFi access technology.

9. A user equipment for discovering handover capabilities of a mobile communication network, wherein the mobile communication network comprises a core network and a radio access network, wherein the user equipment is able to be connected to the mobile communication network using a wireless local area network (WLAN) access technology of the wireless access point, wherein the user equipment is able to be connected to the mobile communication network using a Long Term Evolution (LTE) access technology of the radio access network of the mobile communication network, wherein the user equipment comprises a processor and a memory having processor-executable instructions stored thereon, wherein the processor is configured to execute the processor-executable instructions to facilitate:

receiving handover capability information from the mobile communication network via the WLAN access technology, wherein the handover capability information indicates whether the mobile communication network supports handover from the WLAN access technology to the LTE access technology and is included in a management object (MO), and wherein parameters of the management object are configured over the air using device management; and initiating handover from the WLAN access technology to the LTE access technology only in case that the handover capability information, received from the mobile communication network, indicates that the mobile communication network supports handover from the WLAN access technology to the LTE access technology;

wherein the user equipment is configured not to attempt handover from the WLAN access technology to the LTE access technology in case that the user equipment does not receive handover capability information indicating that the mobile communication network supports handover from the WLAN access technology to the LTE access technology;

wherein the user equipment is further configured to—in case that the handover capability information indicates nothing or erroneous information and the user equipment does not discover that the mobile communication network supports handover from the WLAN access technology to the LTE access technology—prevent initiation of handover from the WLAN access technology to the LTE access technology due to a lack of information existing within the user equipment regarding whether the mobile communication network supports handover from the WLAN access technology to the LTE access technology.

10. The method according to claim 2, wherein the WLAN access technology is WiFi access technology.

11. The method according to claim 1, wherein the management object is an Internet multimedia Subsystem (IMS) management object.

12. The method according to claim 1, wherein the parameters of the management object are configured over the air using Open Mobile Alliance Device Management (OMA DM) protocol.

13. The method according to claim 4, wherein an Internet Key Exchange protocol is used to transmit the handover capability information from an Evolved Packet Data Gateway (ePDG) of the core network to the user equipment.

14. The method according to claim 5, wherein an ATTACH ACCEPT message is used to transmit the handover capability information from the mobile communication network to the user equipment.

15. A non-transitory, computer-readable medium having processor-executable instructions stored thereon for discovering handover capabilities of a mobile communication network, wherein the mobile communication network comprises a core network and a radio access network, wherein a user equipment is able to be connected to the mobile communication network using a wireless local area network (WLAN) access technology of the wireless access point, wherein the user equipment is able to be connected to the mobile communication network using a Long Term Evolution (LTE) access technology of the radio access network of the mobile communication network, wherein the processor-executable instructions, when executed, facilitate performance of the following:

receiving, by the user equipment, handover capability information from the mobile communication network via the WLAN radio access technology, wherein the handover capability information indicates whether the mobile communication network supports handover from the WLAN access technology to the LTE access technology and is included in a management object (MO), and wherein parameters of the management object are configured over the air using device management; and initiating handover, by the user equipment, from the WLAN access technology to the LTE access technology only in case that the handover capability information, received from the mobile communication network, indicates that the mobile communication network supports handover from the WLAN access technology to the LTE access technology;

wherein the user equipment is configured not to attempt handover from the WLAN access technology to the LTE access technology in case that the user equipment does not receive handover capability information indicating that the mobile communication network supports handover from the WLAN access technology to the LTE access technology;

wherein the user equipment is further configured to—in case that the handover capability information indicates nothing or erroneous information and the user equipment does not discover that the mobile communication network supports handover from the WLAN access technology to the LTE access technology—prevent initiation of handover from the WLAN access technology to the LTE access technology due to a lack of information existing within the user equipment regarding whether the mobile communication network supports handover from the WLAN access technology to the LTE access technology.

16. The method according to claim 1, wherein the handover capability information indicates that:
the mobile communication network only supports handover from the LTE access technology to the WLAN access technology; or
the mobile communication network only supports handover from the WLAN access technology to the LTE access technology; or the mobile communication network supports handover both from the LTE access technology to the WLAN access technology and from the WLAN access technology to the LTE access technology.

17. The user equipment according to claim 9, wherein the user equipment is configured to—during a predefined time interval—prevent initiation of handover and/or interrupt an initiated handover in case that the handover capability information lacks information or an indication regarding whether the mobile communication network supports handover from the WLAN access technology to the LTE access technology.

* * * * *